United States Patent
Ribeiro do Nascimento

(10) Patent No.: US 9,929,643 B2
(45) Date of Patent: Mar. 27, 2018

(54) CHARGE PUMP CIRCUIT AND METHOD FOR OPERATING A CHARGE PUMP CIRCUIT

(71) Applicant: NXP B.V., Eindhoven (NL)

(72) Inventor: Ivan Carlos Ribeiro do Nascimento, Campinas (BR)

(73) Assignee: NXP B.V., Eindhoven (NL)

( * ) Notice: Subject to any disclaimer, the term of this patent is extended or adjusted under 35 U.S.C. 154(b) by 61 days.

(21) Appl. No.: 15/086,922

(22) Filed: Mar. 31, 2016

(65) Prior Publication Data

US 2017/0288531 A1    Oct. 5, 2017

(51) Int. Cl.
    *G06F 1/10*    (2006.01)
    *H02M 3/07*    (2006.01)

(52) U.S. Cl.
    CPC ..................... *H02M 3/07* (2013.01)

(58) Field of Classification Search
    CPC ....... H02M 3/07; E02F 9/2292; E02F 9/2289; E02F 9/2296
    See application file for complete search history.

(56) References Cited

U.S. PATENT DOCUMENTS

| | | | |
|---|---|---|---|
| 6,344,959 B1 | 2/2002 | Milazzo | |
| 6,529,421 B1 * | 3/2003 | Marr | G11O 5/147 327/534 |
| 6,674,672 B2 | 1/2004 | Forbes et al. | |
| 7,602,230 B2 | 10/2009 | Castaldo et al. | |
| 8,935,117 B2 | 1/2015 | Tercariol et al. | |
| 9,088,280 B2 | 7/2015 | Jarrar et al. | |

* cited by examiner

*Primary Examiner* — Sibin Chen
(74) *Attorney, Agent, or Firm* — Rajeev Madnawat

(57) ABSTRACT

Embodiments of a charge pump circuit and a method for operating a charge pump circuit are disclosed. In an embodiment, a charge pump circuit includes a charge pump configured to generate a charge pump output voltage, a transistor array including multiple transistor devices that includes at least one transistor device having a back gate terminal coupled to the charge pump output voltage, and a control circuit configured to control the charge pump output voltage so as to regulate the back bias voltage of the transistor devices within the transistor array. Other embodiments are also described.

14 Claims, 8 Drawing Sheets

CHARGE PUMP CIRCUIT AND METHOD FOR OPERATING A CHARGE PUMP CIRCUIT

BACKGROUND

A charge pump uses capacitive devices as energy storage elements to convert an input direct current (DC) voltage into a desired output DC voltage, which may be higher than or lower than the input DC voltage. A charge pump can be used to drive one or more load devices with a charge pump output voltage. However, due to process and temperature variations, transistor devices can exhibit different behavior under the same voltage. Consequently, driving transistor devices using a fixed charge pump output voltage may result in a large leakage current within the transistor devices, which can negatively affect the performance of the transistor devices. A resistive device, such as a resistive ladder, can be used to sense or regulate the output voltage of the charge pump. However, a resistive device typically consumes large current and results in large power consumption, which is not desirable for low power charge pump circuits.

SUMMARY

Embodiments of a charge pump circuit and a method for operating a charge pump circuit are disclosed. In an embodiment, a charge pump circuit includes a charge pump configured to generate a charge pump output voltage, a transistor array including multiple transistor devices that includes at least one transistor device having a back gate terminal coupled to the charge pump output voltage, and a control circuit configured to control the charge pump output voltage so as to regulate the back bias voltage of the transistor devices within the transistor array. Other embodiments are also described.

In an embodiment, the transistor devices of the transistor array comprise a first transistor device. A gate terminal and a drain terminal of the first transistor device are connected to each other. A back gate terminal of the first transistor device is coupled to the charge pump output voltage.

In an embodiment, the transistor devices of the transistor array further comprise a second transistor device connected in parallel with the first transistor device. A gate terminal and a drain terminal of the second transistor device are connected to each other. A back gate terminal of the second transistor device is coupled to a fixed voltage.

In an embodiment, the control circuit includes a first current source connected to the gate terminal and the drain terminal of the first transistor device, to a first input terminal of the charge pump, and to a second fixed voltage and a second current source connected to the gate terminal and the drain terminal of the second transistor device, to a second input terminal of the charge pump, and to the second fixed voltage.

In an embodiment, the first and second transistor devices are of the same type. A ratio between a gate width of the first transistor device and a gate length of the first transistor device is different from a ratio between a gate width of the second transistor device and a gate length of the second transistor device.

In an embodiment, the first and second transistor devices are of the same type. A current level of the first current source is different from a current level of the second current source.

In an embodiment, the fixed voltage is a positive fixed voltage. The first and second transistor devices are PMOS transistors with source terminals connected to the positive fixed voltage. The first and second current sources are connected to ground.

In an embodiment, the first and second transistor devices are NMOS transistors with source terminals connected to ground. The first and second current sources are connected to a positive voltage.

In an embodiment, the control circuit comprises a first current source connected to the gate terminal and the drain terminal of the first transistor device, to a first input terminal of the charge pump, and to a second fixed voltage, a resistor connected to the gate terminal and to the drain terminal of the second transistor device, and a second current source connected to the resistor, to a second input terminal of the charge pump, and to the second fixed voltage.

In an embodiment, the first and second transistor devices are of the same type. A ratio between a gate width of the first transistor device and a gate length of the first transistor device is equal to a ratio between a gate width of the second transistor device and a gate length of the second transistor device.

In an embodiment, a gate terminal and a source terminal of each of the transistor devices of the transistor array are connected to each other. A back gate terminal of each of the transistor devices is coupled to the charge pump output voltage.

In an embodiment, the gate terminal and the source terminal of each of the transistor devices are coupled to a fixed voltage.

In an embodiment, the control circuit comprises a current source connected to the drain terminal of each of the transistor devices and to a second fixed voltage, a capacitor connected to the drain terminal of each of the transistor devices and to the second fixed voltage, a Schmitt trigger with an inverted output connected to the drain terminal of each of the transistor devices, and an inverter connected to an output terminal of the Schmitt trigger and to an input terminal of the charge pump.

In an embodiment, the control circuit comprises a first current mirror connected to the gate terminal and to the source terminal of each of the transistor devices and to a second fixed voltage, a second current mirror connected to the gate terminal and to the source terminal of each of the transistor devices and to the first current mirror, a capacitor connected to the drain terminal of each of the transistor devices and to the second fixed voltage, a current source connected to the second current mirror and to the second fixed voltage, and a Schmitt trigger with an inverted output connected to the first and second current mirrors and to an input terminal of the charge pump.

In an embodiment, the transistor devices are of the same type. A ratio between a gate width of a first transistor device of the transistor devices and a gate length of the first transistor device is the same as a ratio between a gate width of a second transistor device of the transistor devices and a gate length of the second transistor device.

In an embodiment, a charge pump circuit includes a charge pump configured to generate a charge pump output voltage, a transistor array including p-channel MOSFET (PMOS) transistors, and a control circuit configured to control the charge pump output voltage so as to regulate the back bias voltage of the PMOS transistors within the transistor array. A gate terminal and a source terminal of each of the PMOS transistors are connected to each other. A back gate terminal of each of the PMOS transistors is coupled to the charge pump output voltage. The gate terminal and the source terminal of each of the transistors are coupled to a fixed voltage.

In an embodiment, the control circuit comprises a current source connected to the drain terminal of each of the PMOS transistors and to ground, a capacitor connected to the drain terminal of each of the PMOS transistors and to ground, a Schmitt trigger connected to the drain terminal of each of the PMOS transistors, and an inverter connected to an output terminal of the Schmitt trigger and to an input terminal of the charge pump.

In an embodiment, the control circuit comprises a first current mirror connected to the gate terminal and the source terminal of each of the PMOS transistors and to ground, a second current mirror connected to the gate terminal and the source terminal of each of the PMOS transistors and to the first current mirror, a capacitor connected to the drain terminal of each of the PMOS transistors and to ground, a current source connected to the second current mirror and to ground, and a Schmitt trigger connected to the first and second current mirrors and to an input terminal of the charge pump.

In an embodiment, a ratio between a gate width of a first PMOS transistor of the PMOS transistors and a gate length of the first PMOS transistor is the same as a ratio between a gate width of a second PMOS transistor of the PMOS transistors and a gate length of the second PMOS transistor.

In an embodiment, a method for operating a charge pump circuit involves generating a charge pump output voltage, operating a transistor array of the charge pump circuit in response to the charge pump output voltage, and controlling the charge pump output voltage so as to regulate the back bias voltage of transistors within the transistor array.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
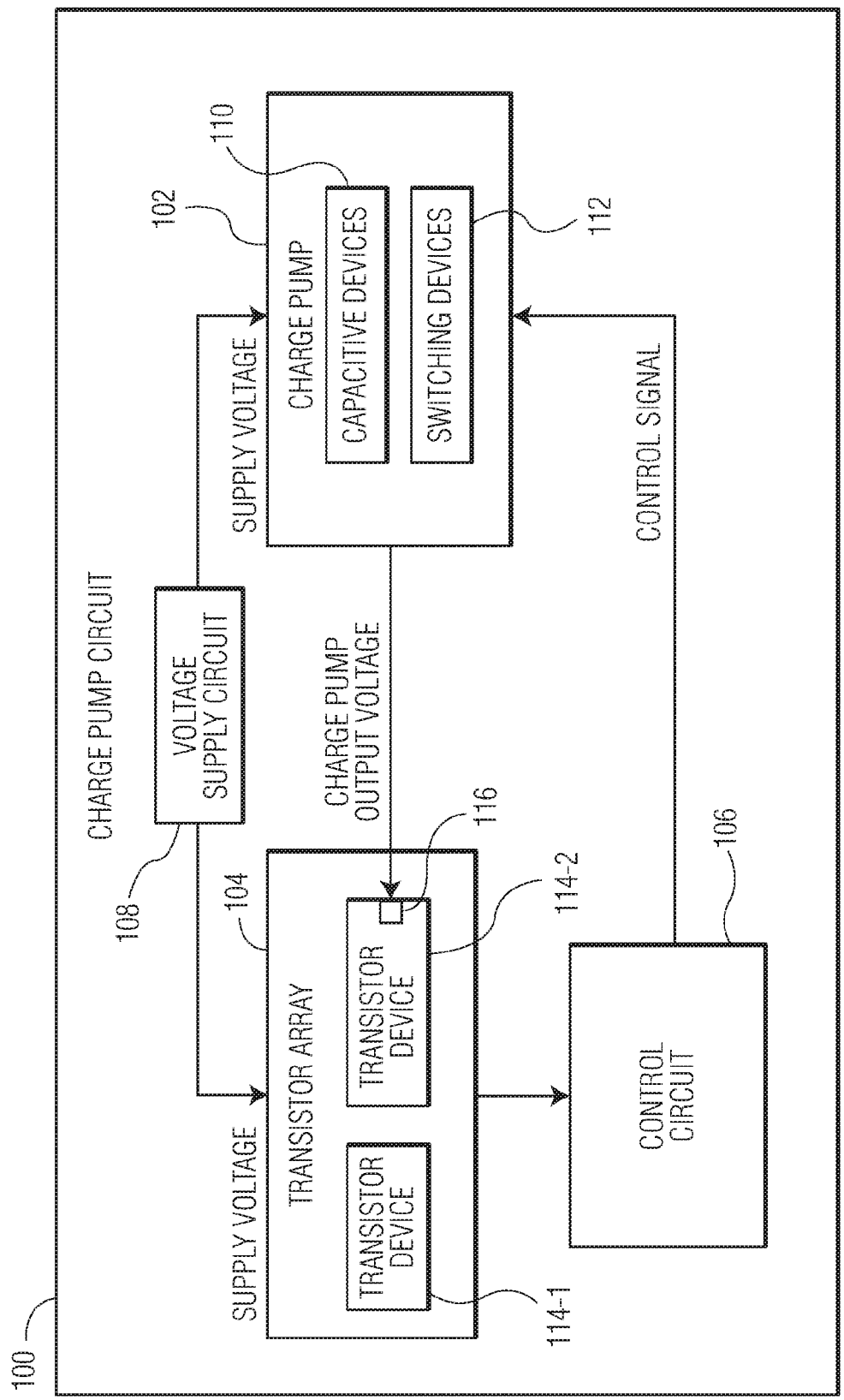
FIG. 1 depicts a charge pump device in accordance with an embodiment of the invention.

FIG. 1 depicts a charge pump circuit 100 in accordance with an embodiment of the invention. In the embodiment depicted in FIG. 1, the charge pump circuit includes a charge pump 102, a transistor array 104, and a control circuit 106. The charge pump circuit may be an integrated circuit (IC) device, such as an IC module. Although the illustrated charge pump circuit is shown with certain components and described with certain functionality herein, other embodiments of the charge pump circuit may include fewer or more components to implement the same, less, or more functionality. For example, in some embodiments, the charge pump circuit may include a voltage supply circuit 108 configured to generate a fixed supply voltage for the charge pump and/or the transistor array. In some embodiments, the voltage supply circuit is external to an Integrated Circuit (IC) device that includes the charge pump circuit.

The charge pump circuit 100 depicted in FIG. 1 can set the back bias voltage of transistor devices 114-1, 114-2 within the transistor array 104 to a desired value by controlling the charge pump output voltage of the charge pump 102. Consequently, the transistors within the transistor array can operate in a desired state (e.g., in a subthreshold regime where the channel is weakly inverted) and the leakage current of transistors within the transistor array can be reduced. The charge pump circuit depicted in FIG. 1 can be used to set forward back bias voltage (FBB) of transistor devices within the transistor array or the reverse and forward back bias voltage of transistor devices within the transistor array. Compared to a charge pump circuit in which transistor devices are driven by a fixed charge pump output voltage, the charge pump circuit 100 depicted in FIG. 1 can change the charge pump output voltage in response to process and temperature variations. Consequently, compared to a charge pump circuit in which transistor devices are driven by a fixed charge pump output voltage, the charge pump circuit 100 depicted in FIG. 1 allows the transistor devices within the transistor array to operate in a desired state, resulting in reductions in leakage current of transistors within the transistor array. In addition, compared to a charge pump circuit in which a resistive device is used to sense or regulate the output voltage of a corresponding charge pump, the charge pump circuit 100 depicted in FIG. 1 simplifies the charge pump control by using feedback from the transistor array to set the charge pump output voltage of the charge pump. Consequently, compared to a charge pump circuit in which a resistive device is used to sense or regulate the output voltage of a corresponding charge pump, the charge pump circuit 100 depicted in FIG. 1 can set the charge pump output voltage of the charge pump with low DC current consumption or no DC current consumption, thus providing a low-power device. In addition, compared to a charge pump circuit in which a resistive device is used to sense or regulate the output voltage of a corresponding charge pump, the charge pump circuit 100 depicted in FIG. 1 can be implemented with less substrate area. Consequently, the charge pump circuit 100 depicted in FIG. 1 can be used in low power compact IC applications, such as memory circuits or microcontroller circuits.

The charge pump 102 of the charge pump circuit 100 is configured to generate a charge pump output voltage. The charge pump typically includes capacitive devices 110 such as capacitors and switching devices 112, such as n-channel MOSFET (NMOS) transistors or PMOS transistors. For example, the charge pump may include one or more switching bridges, such as, a fully balanced bridge structure. In some embodiments, the charge pump converts an input DC supply voltage into the charge pump output voltage based on a control signal from the control circuit 106.

The transistor array 104 of the charge pump circuit 100 is a load of the charge pump 102 and is driven by the charge pump output voltage of the charge pump. In some embodiments, a back gate terminal of one or more transistor devices of the transistor array is coupled to the charge pump output voltage that is generated by the charge pump. The back gate terminal of a transistor may be, for example, a back gate pin of a Fully Depleted Silicon on Insulator (FDSOI) transistor or the body gate of a bulk transistor. In the embodiment depicted in FIG. 1, the transistor array includes two transistor devices 114-1, 114-2 and the back gate terminal 116 of the transistor device 114-2 is coupled to the charge pump output voltage. Although the back gate terminal of the transistor device 114-2 is shown in FIG. 1 as coupled to the charge pump output voltage, in other embodiments, the back gate terminal of each transistor device within the transistor array is coupled to the charge pump output voltage. In addition, although the transistor array is shown in FIG. 1 as including two transistor devices, in other embodiments, the number of transistors within the transistor array is more than two. In some embodiments, the transistor array includes sea of gates, which contains a large number (e.g., in the hundreds or in the thousands) of transistors. The transistor array may be implemented as switching circuit cells, such as memory cells or microcontroller cells. The transistor array may include transistor devices connected in parallel to each other, as described in more detail with reference to FIGS. 2-7.

The control circuit 106 of the charge pump circuit 100 is configured to control the charge pump output voltage of the charge pump 102 so as to set or regulate the back bias voltage of transistor devices 114-1, 114-2 within the transistor array 104. By controlling the charge pump output voltage of the charge pump, the back bias voltage of transistors within the transistor array can be set to a desired value and the transistors within the transistor array can operate in a desired state (e.g., in a subthreshold regime where the channel is weakly inverted). Consequently, the leakage current of transistors within the transistor array can be reduced.

The control circuit 106 can use different techniques to control the charge pump voltage of the charge pump 102 to set the back bias voltage of transistor devices 114-1, 114-2 within the transistor array 104. For example, the control circuit can control the charge pump voltage of the charge pump by controlling a rate at which a current varies within the transistor array, by controlling threshold voltage changes within the transistor array, or by directly controlling leakage current within the transistor array.

Figure 2:
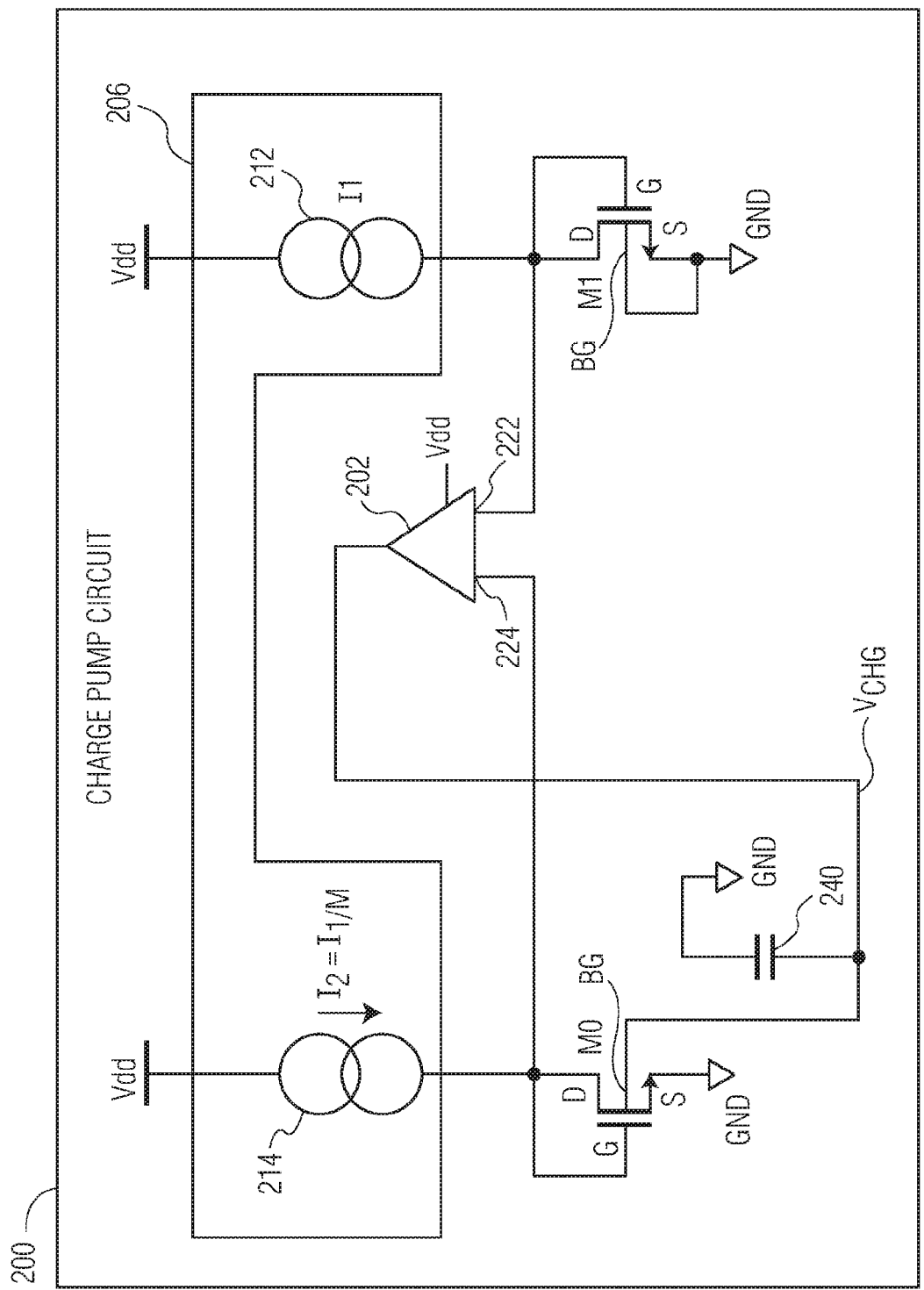
FIG. 2 depicts an embodiment of the charge pump circuit depicted in FIG. 1 that is configured to control a reduction in a current within a transistor array.

FIG. 2 depicts an embodiment of the charge pump circuit 100 depicted in FIG. 1 that controls a reduction in a current within a transistor array. In the embodiment depicted in FIG. 2, a charge pump circuit 200 includes a charge pump 202, a transistor array that includes two NMOS transistors, "M0," "M1," and a control circuit 206 that includes two current sources 212, 214. The charge pump circuit 200 depicted in FIG. 2 is one possible embodiment of the charge pump circuit 100 depicted in FIG. 1. However, the charge pump circuit 100 depicted in FIG. 1 is not limited to the embodiment shown in FIG. 2.

In the charge pump circuit 200 depicted in FIG. 2, the drain terminal D and the gate terminal G of the NMOS transistor M1 are connected to each other. In addition, the drain terminal D and the gate terminal G of the NMOS transistor M1 are connected to the current source 212 and to a first input terminal 222 of the charge pump. The drain terminal D and the gate terminal G of the NMOS transistor M0 are connected to each other. In addition, the drain terminal D and the gate terminal G of the NMOS transistor M0 are connected to the current source 214 and to a second input terminal 224 of the charge pump. The source terminal S of the NMOS transistor M0 and the source terminal S of the NMOS transistor M1 are connected to ground (GND). The back gate terminal BG of the NMOS transistor M0 is connected to the charge pump voltage $V_{CHG}$ that is generated by the charge pump 202 and to ground through a capacitor 240. The back gate terminal BG of the NMOS transistor M1 is connected to ground.

In the charge pump circuit 200 depicted in FIG. 2, the current, "I1," produced by the current source 212 and the current, "I2," produced by the current source 214 can be expressed as:

$$I_2 = \frac{I_1}{M}, \tag{1}$$

where M is a positive integer. When each of the transistors, M0, M1, is in the sub-threshold region, the following equation applies:

$$I_D = \frac{W}{L} \cdot I_{SO} \cdot e^{\frac{V_{GS}}{n \cdot V_t}}, \quad (2)$$

where $I_D$ represents the drain current of an NMOS transistor, W represents the gate length of the NMOS transistor, L represents the gate width of the NMOS transistor, Vgs represents the gate to source voltage of the NMOS transistor, Iso represents the weak inversion current of the transistor when Vgs is zero, n represents the MOS weak inversion coefficient, and Vt represents the thermal voltage of the NMOS transistor. The thermal voltage Vt can be expressed as:

$$Vt = k \cdot T/q, \quad (3)$$

where k represents the Boltzmann constant, T represents absolute temperature in degrees Kelvin, and q represents the electron charge. The thermal voltage Vt of an NMOS transistor is 25.9 mV at 27° C. Conversely, the weak inversion current, Iso, of an NMOS transistor can be expressed as:

$$I_{SO} = I_{SVTH} \cdot e^{\frac{-V_{TH}}{n \cdot V_t}}, \quad (4)$$

where $V_{TH}$ represents the threshold voltage of the NMOS transistor and $I_{SVTH}$ represents the weak current parameter at $V_{TH}$ voltage. Consequently, the drain current of an NMOS transistor can be expressed as:

$$I_D = \frac{W}{L} \cdot I_{SVTH} \cdot e^{\frac{V_{GS} - V_{TH}}{n \cdot V_t}}. \quad (5)$$

It may be more convenient to use drain current (ID) as a function of $I_{SVTH}$ and $V_{TH}$ since when $V_{TH}$ changes (due back bias effects), $I_{SVTH}$ is kept the same (for a first order model). The threshold voltage $V_{TH}$ of a transistor can be expressed as a function of the back bias voltage ($V_{BKB}$) of the transistor. For example, the threshold voltage $V_{TH}$ of an NMOS transistor can be expressed as:

$$V_{TH} = V_{THO} - V_{BK2VTH} \cdot V_{BKB}, \quad (6)$$

where $V_{THO}$ represents the zero bias MOS threshold voltage of the transistor, $V_{BKB}$ represents the back bias voltage of the transistor, and $V_{BK2VTH}$ represents the constant of the linear function of $V_{TH}$ with respect to the back bias voltage. Consequently, the drain current of an NMOS transistor can be expressed as:

$$I_D = \frac{W}{L} \cdot I_{SVTH} \cdot e^{\frac{V_{GS} - V_{THO} + V_{BK2VTH} \cdot V_{BKB}}{n \cdot V_t}}. \quad (7)$$

The gate to source voltage $V_{GS}$ of an NMOS transistor can be defined as:

$$V_{GS} = nv \cdot V_t \cdot \ln\left(\frac{I_D}{I_{SVTH} \cdot W/L}\right) + V_{THO} - V_{BK2VTH} \cdot V_{BKB}. \quad (8)$$

In the NMOS transistors M0, M1, the ratio between the gate width of the NMOS transistor M0 and the gate length of the NMOS transistor M0 and the ratio between the gate width of the NMOS transistor M1 and the gate length of the NMOS transistor M1 can be expressed as:

$$\frac{W1}{L1} = P \cdot \frac{W0}{L0} \quad (9)$$

where W0 represents the gate width of the NMOS transistor M0, L0 represents the gate length of the NMOS transistor M0, W1 represents the gate width of the NMOS transistor M1, L1 represents the gate length of the NMOS transistor M1, and P is a positive integer. The gate to source voltage $Vgs_0$ of the NMOS transistor M0 can be expressed as:

$$V_{GS0} = n \cdot V_t \cdot \ln\left(\frac{I_{D0}}{I_{SVTH} \cdot W/L}\right) + V_{THO} - V_{BK2VTH} \cdot V_{BKB0}. \quad (10)$$

The gate to source voltage $Vgs_1$ of the NMOS transistor M1 can be expressed as:

$$V_{GS1} = n \cdot V_t \cdot \ln\left(\frac{I_{D1}}{M1 \cdot I_{SVTH} \cdot W/L}\right) + V_{THO} - V_{BK2VTH} \cdot V_{BKB1}. \quad (11)$$

$$V_{GS1} = n \cdot V_t \cdot \left[\ln\left(\frac{I_{D1}}{I_{SVTH} \cdot W/L}\right) - \ln(P)\right] + V_{THO} - V_{BK2VTH} \cdot V_{BKB1}. \quad (12)$$

$$V_{GS1} = \quad (13)$$
$$n \cdot V_t \cdot \left[\ln\left(\frac{I_{D0}}{I_{SVTH} \cdot W/L}\right) - \ln\left(\frac{I_{D0}}{I_{D1}}\right) - \ln(P)\right] + V_{THO} - V_{BK2VTH} \cdot V_{BKB1}$$

The gate to source voltage $Vgs_1$ of the NMOS transistor M1 can be expressed as:

$$V_{GS1} = V_{GS0} - nv \cdot V_t \cdot \left[\ln\left(\frac{I_{D0}}{I_{D1}}\right) + \ln(P)\right] - V_{BK2VTH} \cdot [V_{BKB1} - V_{BKB0}]. \quad (14)$$

When the gate to source voltage $Vgs_1$ of the NMOS transistor M1 is equal to the gate to source voltage $Vgs_0$ of the NMOS transistor M0, the ratio between the drain current Id0 of the NMOS transistor M0 and the drain current Id1 of the NMOS transistor M1 and the gate width/length ratio P between the NMOS transistor M1 and the NMOS transistor M0 satisfy:

$$0 = -n \cdot V_t \cdot \left[\ln\left(\frac{I_{D0}}{I_{D1}}\right) + \ln(P)\right] - V_{BK2VTH} \cdot [V_{BKB1} - V_{BKB0}] \quad (15)$$

$$n \cdot V_t \cdot \left[\ln\left(\frac{I_{D0}}{I_{D1}}\right) + \ln(P)\right] - V_{BK2VTH} \cdot [V_{BKB0} - V_{BKB1}] \quad (16)$$

As evidenced by equation (16), by adjusting the ratio between the drain current Id0 of the NMOS transistor M0 and the drain current Id1 of the NMOS transistor M1 or by adjusting the gate width/length ratio P between the NMOS transistor M1 and the NMOS transistor M0, the difference between the back gate bias voltage of the NMOS transistors M0, M1 can be controlled. The NMOS transistors M0, M1 can be selected or manufactured with specific configuration such that a specific value of the gate width/length ratio P between the NMOS transistor M1 and the NMOS transistor M0 can be obtained. In addition, the current sources 212, 214 can be selected or manufactured with specific current levels such that a specific value of the ratio between the drain current Id0 of the NMOS transistor M0 and the drain current Id1 of the NMOS transistor M1 can be obtained. Consequently, the back bias voltage of the NMOS transistors M0, M1 within the transistor array can be set to a desired value and the NMOS transistors M0, M1 within the transistor array can operate in a desired state (e.g., in a sub-threshold regime where the channel is weakly inverted). As a result, the leakage current of the NMOS transistors M0, M1 can be reduced.

Figure 3:
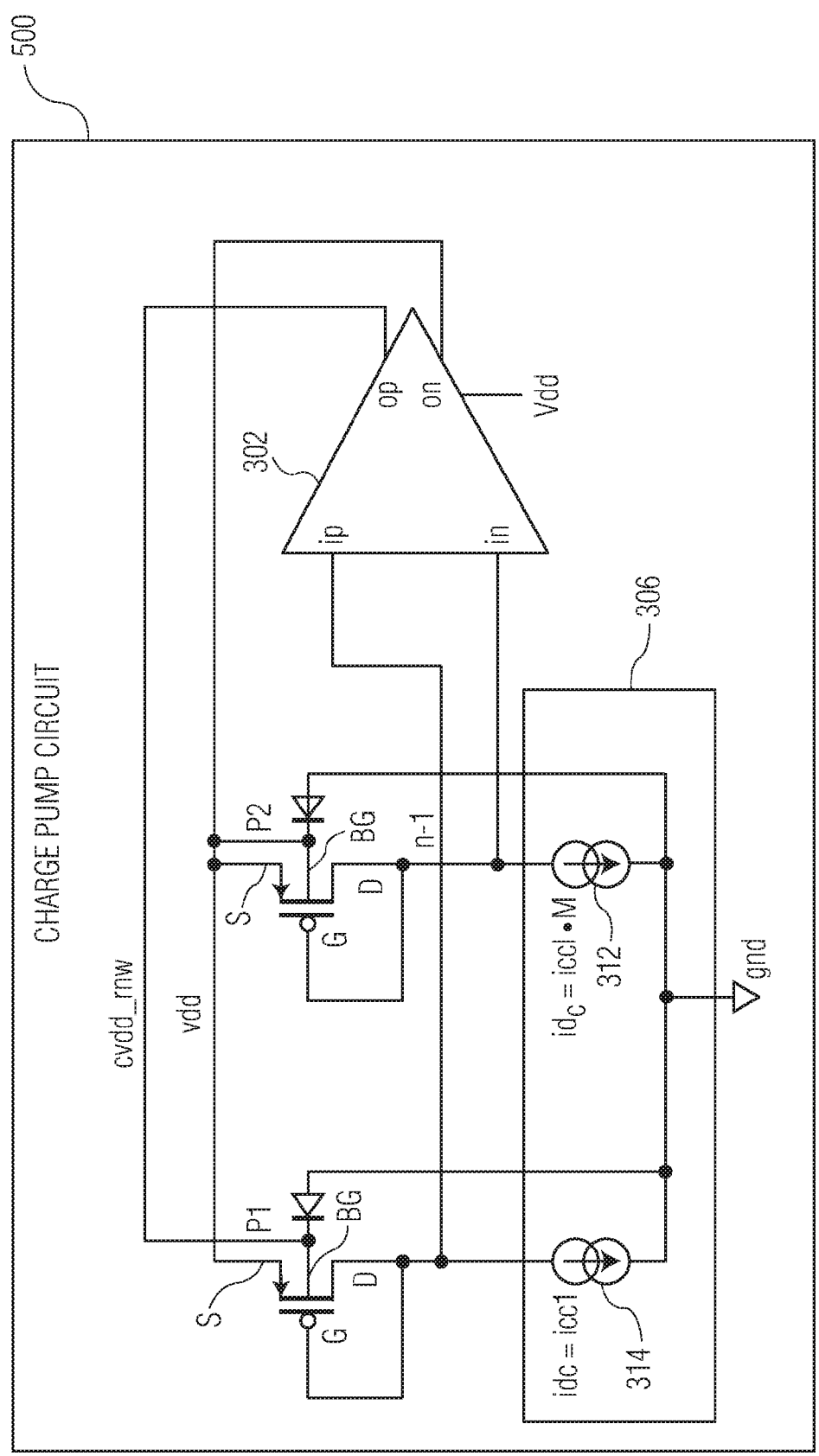
FIG. 3 depicts a PMOS implementation of the charge pump circuit depicted in FIG. 2.

FIG. 3 depicts a PMOS implementation of the charge pump circuit 200 depicted in FIG. 2. In the embodiment depicted in FIG. 3, a charge pump circuit 300 includes a charge pump 302, a transistor array that includes two PMOS transistors, "P1," "P2," and a control circuit 306 that includes two current sources 312, 314. The charge pump circuit 300 depicted in FIG. 3 is one possible embodiment of the charge pump circuit 100 depicted in FIG. 1. However, the charge pump circuit 100 depicted in FIG. 1 is not limited to the embodiment shown in FIG. 3.

In the charge pump circuit 300 depicted in FIG. 3, the drain terminal D and the gate terminal G of the PMOS transistor P2 are connected to each other. In addition, the drain terminal D and the gate terminal G of the PMOS transistor P2 are connected to the current source 312 and to a negative input terminal "in" of the charge pump 302. The drain terminal D and the gate terminal G of the PMOS transistor P1 are connected to each other. In addition, the drain terminal D and the gate terminal G of the PMOS transistor P1 are connected to the current source 314 and to a positive input terminal "ip" of the charge pump. In some embodiments, the charge pump is turned on when the positive voltage Vip at the positive input terminal is higher than the negative voltage Vin at the negative input terminal. The source terminal S of the PMOS transistor P1 and the source terminal S of the PMOS transistor P2 are connected to the supply voltage Vdd. The back gate terminal BG of the PMOS transistor P1 is connected to the charge pump voltage cvbb_rnw that is generated by the charge pump and the back gate terminal BG of the PMOS transistor P2 is connected to the supply voltage Vdd. When the gate to source voltage $Vgs_2$ of the PMOS transistor P2 is equal to the gate to source voltage $Vgs_1$ of the PMOS transistor P1, the ratio between the drain current Id1 of the PMOS transistor P1 and the drain current Id2 of the PMOS transistor P2 and the gate width/length ratio P between the PMOS transistor P1 and the PMOS transistor P2 satisfy:

$$n \cdot Vt \cdot \left[\ln\left(\frac{I_{D1}}{I_{D2}}\right) + \ln(P)\right] - V_{BK2VTH} \cdot [V_{BKB0} - V_{BKB1}] \quad (17)$$

As evidenced by equation (17), by adjusting the ratio between the drain current Id1 of the PMOS transistor P1 and the drain current Id2 of the PMOS transistor P2 or by adjusting the gate width/length ratio P between the PMOS transistor P2 and the PMOS transistor P1, the difference between the back gate bias voltage of the PMOS transistors P1, P2 can be controlled. The PMOS transistors P1, P2 can be selected or manufactured with specific configuration such that a specific value of the gate width/length ratio P between the PMOS transistor P2 and the PMOS transistor P1 can be obtained. In addition, the current sources 312, 314 can be selected or manufactured with specific current levels such that a specific value of the ratio between the drain current Id1 of the PMOS transistor P1 and the drain current Id2 of the PMOS transistor P2 can be obtained. Consequently, the back bias voltage of the PMOS transistors P1, P2 within the transistor array can be set to a desired value and the PMOS transistors P1, P2 within the transistor array can operate in a desired state (e.g., in a subthreshold regime where the channel is weakly inverted). As a result, the leakage current of the PMOS transistors P1, P2 can be reduced.

Figure 4:
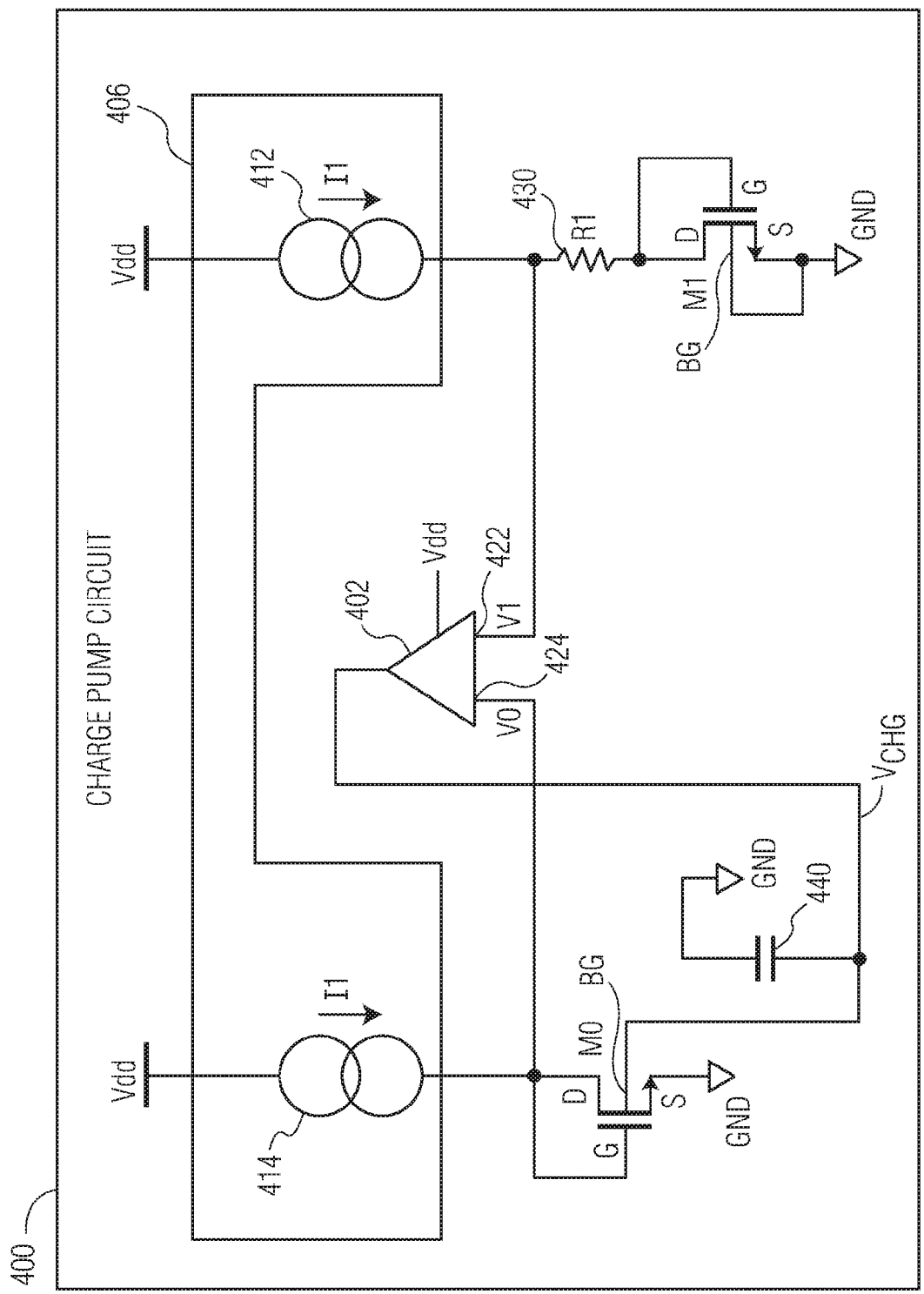
FIG. 4 depicts an embodiment of the charge pump circuit depicted in FIG. 1 that is configured to control a threshold voltage within a transistor array.

FIG. 4 depicts an embodiment of the charge pump circuit 100 depicted in FIG. 1 that controls a threshold voltage within a transistor array. In the embodiment depicted in FIG. 4, a charge pump circuit 400 includes a charge pump 402, a transistor array that includes two NMOS transistors, "M0," "M1," and a control circuit 406 that includes two current sources 412, 414 and a resistor "R1" 430. The charge pump circuit 400 depicted in FIG. 4 is one possible embodiment of the charge pump circuit 100 depicted in FIG. 1. However, the charge pump circuit 100 depicted in FIG. 1 is not limited to the embodiment shown in FIG. 4.

In the charge pump circuit 400 depicted in FIG. 4, the drain terminal D and the gate terminal G of the NMOS transistor M1 are connected to each other. In addition, the drain terminal D and the gate terminal G of the NMOS transistor M1 are connected to a first terminal of the resistor 430 while a second terminal of the resistor 430 is connected to the current source 412 and to a first input terminal 422 of the charge pump 402. The drain terminal D and the gate terminal G of the NMOS transistor M0 are connected to each other. In addition, the drain terminal D and the gate terminal G of the NMOS transistor M0 are connected to the current source 414 and to a second input terminal 424 of the charge pump. The source terminal S of the NMOS transistor M0 and the source terminal S of the NMOS transistor M1 are connected to ground. The back gate terminal BG of the NMOS transistor M0 is connected to the charge pump voltage $V_{CHG}$ that is generated by the charge pump and the back gate terminal BG of the NMOS transistor M1 is connected to ground.

In the charge pump circuit 400 depicted in FIG. 4, the charge pump 402 is activated when the voltage $V_1$ at input terminal 422 is higher than the voltage $V_0$ at the input terminal 424 and reaches a stable condition when the voltage $V_1$ at the terminal 422 is equal to the voltage $V_0$ at the terminal 424. The charge pump 402 is disabled when the voltage $V_1$ at input terminal 422 is lower than the voltage $V_0$ at the input terminal 424. A voltage drop ΔV is generated by the resistor 430 and the charge pump is controlled using the $V_{BK2VTH}$ transfer function. The gate to source voltage Vgs of an NMOS transistor can be defined as:

$$V_{GS} = n \cdot Vt \cdot \ln\left(\frac{I_D}{I_{SVTH} \cdot W/L}\right) + V_{THO} - V_{BK2VTH} \cdot V_{BKB}. \quad (18)$$

where $I_D$ represents the drain current of the NMOS transistor, W represents the gate length of the NMOS transistor, L represents the gate width of the NMOS transistor, Vt represents the thermal voltage of the NMOS transistor, $V_{THO}$ represents the zero bias MOS threshold voltage of the transistor, $V_{BKB}$ represents the back bias voltage of the transistor, and $V_{BK2VTH}$ represents the constant of the linear function of VT with respect to the back bias voltage. The gate to source to voltage $Vgs_0$ of the NMOS transistor M0 can be expressed:

$$V_{GS0} = n \cdot Vt \cdot \ln\left(\frac{I_{D0}}{I_{SVTH} \cdot W/L}\right) + V_{THO} - V_{BK2VTH} \cdot V_{BKB0}. \quad (19)$$

The gate to source voltage $Vgs_1$ of the NMOS transistor M1 can be expressed:

$$V_{GS1} = n \cdot Vt \cdot \ln\left(\frac{I_{D1}}{M1 \cdot I_{SVTH} \cdot W/L}\right) + V_{THO} - V_{BK2VTH} \cdot V_{BKB1}. \quad (20)$$

The NMOS transistors M0, M1 are biased by the same current I1. When the NMOS transistors M0, M1 are identical to each other, the input voltages $V_1$, $V_0$ of the charge pump satisfy:

$$V_1 = V_{GS1} + \Delta V = n \cdot Vt \cdot \ln\left(\frac{I_1}{I_{SVTH} \cdot W/L}\right) + V_{THO} + \Delta V \quad (21)$$

$$V_0 = V_{GS0} = n \cdot Vt \cdot \ln\left(\frac{I_1}{I_{SVTH} \cdot W/L}\right) + V_{THO} - V_{BK2VTH} \cdot V_{BKB0} \quad (22)$$

When the input voltages $V_1$, $V_0$ of the charge pump are equal to each other, $$V_{GS0} = V_{GS1} + \Delta V \quad (23)$$

$$V_{GS1} - V_{BK2VTH} \cdot V_{BKB1} = V_{GS1} + \Delta V \quad (24)$$

$$-V_{BK2VTH} \cdot V_{BKB1} = \Delta V \quad (25)$$

$V_{BK2VTH}$ can be approximated by a constant value. As evidenced by equation (25), the back gate bias voltage of the NMOS transistor M1 can be controlled by the resistance value of the resistor 430. The resistor can be selected or manufactured with a specific resistance value. Alternatively, the resistor may be a programmable resistor such that the resistance value of the resistor can be adjusted on the fly. Consequently, the back bias voltage of the NMOS transistors M0, M1 within the transistor array can be set to a desired value and the NMOS transistors M0, M1 can operate in a desired state (e.g., in a subthreshold regime where the channel is weakly inverted). As a result, the leakage current of the NMOS transistors M0, M1 can be reduced.

Figure 5:
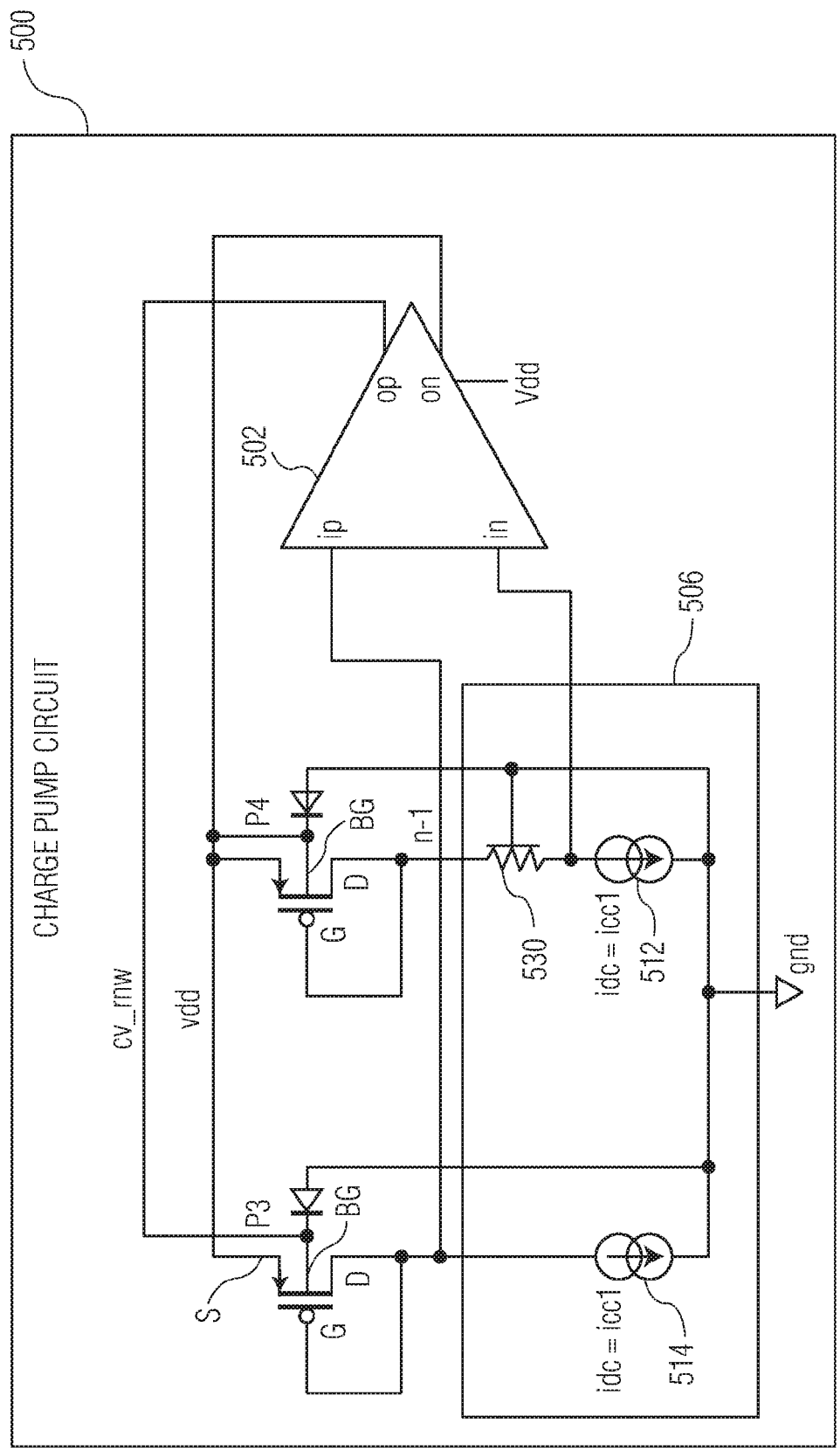
FIG. 5 depicts a PMOS implementation of the charge pump circuit depicted in FIG. 4.

FIG. 5 depicts a PMOS implementation of the charge pump circuit 400 depicted in FIG. 4. In the embodiment depicted in FIG. 5, a charge pump circuit 500 includes a charge pump 502, a transistor array that includes two PMOS transistors, "P3," "P4," and a control circuit 506 that includes two current sources 512, 514 and a resistor 530. The charge pump circuit 500 depicted in FIG. 5 is one possible embodiment of the charge pump circuit 100 depicted in FIG. 1. However, the charge pump circuit 100 depicted in FIG. 1 is not limited to the embodiment shown in FIG. 5.

In the charge pump circuit 500 depicted in FIG. 5, the drain terminal D and the gate terminal G of the PMOS transistor P4 are connected to each other. In addition, the drain terminal D and the gate terminal G of the PMOS transistor P4 are connected to a first terminal of the resistor 530 while a second terminal of the resistor 530 is connected to the current source 512 and to a first input terminal "in" of the charge pump 502. The drain terminal D and the gate terminal G of the PMOS transistor P3 are connected to each other. In addition, the drain terminal D and the gate terminal G of the PMOS transistor P3 are connected to the current source 514 and to a second input terminal "ip" of the charge pump. The charge pump 502 is activated when the voltage at the second terminal ip is higher than the voltage at the first terminal in and reaches a stable condition when the voltage at the second terminal ip is equal to the voltage at the first terminal in. The charge pump 502 is disabled when the voltage at the second terminal ip is lower than the voltage at the first terminal in. The source terminal S of the PMOS transistor P3 and the source terminal S of the PMOS transistor P4 are connected to the supply voltage Vdd. The back gate terminal BG of the PMOS transistor P3 is connected to the charge pump voltage cvbb_rnw that is generated by the charge pump and the back gate terminal BG of the PMOS transistor P4 is connected to the supply voltage Vdd. In the charge pump circuit depicted in FIG. 5, when the PMOS transistors P3, P4 are identical to each other and the input voltages of the charge pump are equal to each other, the voltage drop $\Delta V$ generated by the resistor 530 can be expressed as:

$$-V_{BK2VTH} \cdot V_{BKB1} = \Delta V \quad (26)$$

$V_{BKB}$ represents the back bias voltage of the PMOS transistor P3, and $V_{BK2VTH}$ represents the constant of the linear function of $V_{TH}$ with respect to the back bias voltage. $V_{BK2VTH}$ can be approximated by a constant value. As evidenced by equation (26), the back gate bias voltage of the PMOS transistor P4 can be controlled by the resistance value of the resistor 530. The resistor can be selected or manufactured with a specific resistance value. Alternatively, the resistor may be a programmable resistor such that the resistance value of the resistor can be adjusted on the fly. Consequently, the back bias voltage of the PMOS transistors P3, P4 within the transistor array can be set to a desired value and the PMOS transistors P3, P4 can operate in a desired state (e.g., in a subthreshold regime where the channel is weakly inverted). As a result, the leakage current of the PMOS transistors P3, P4 can be reduced.

Figure 6:
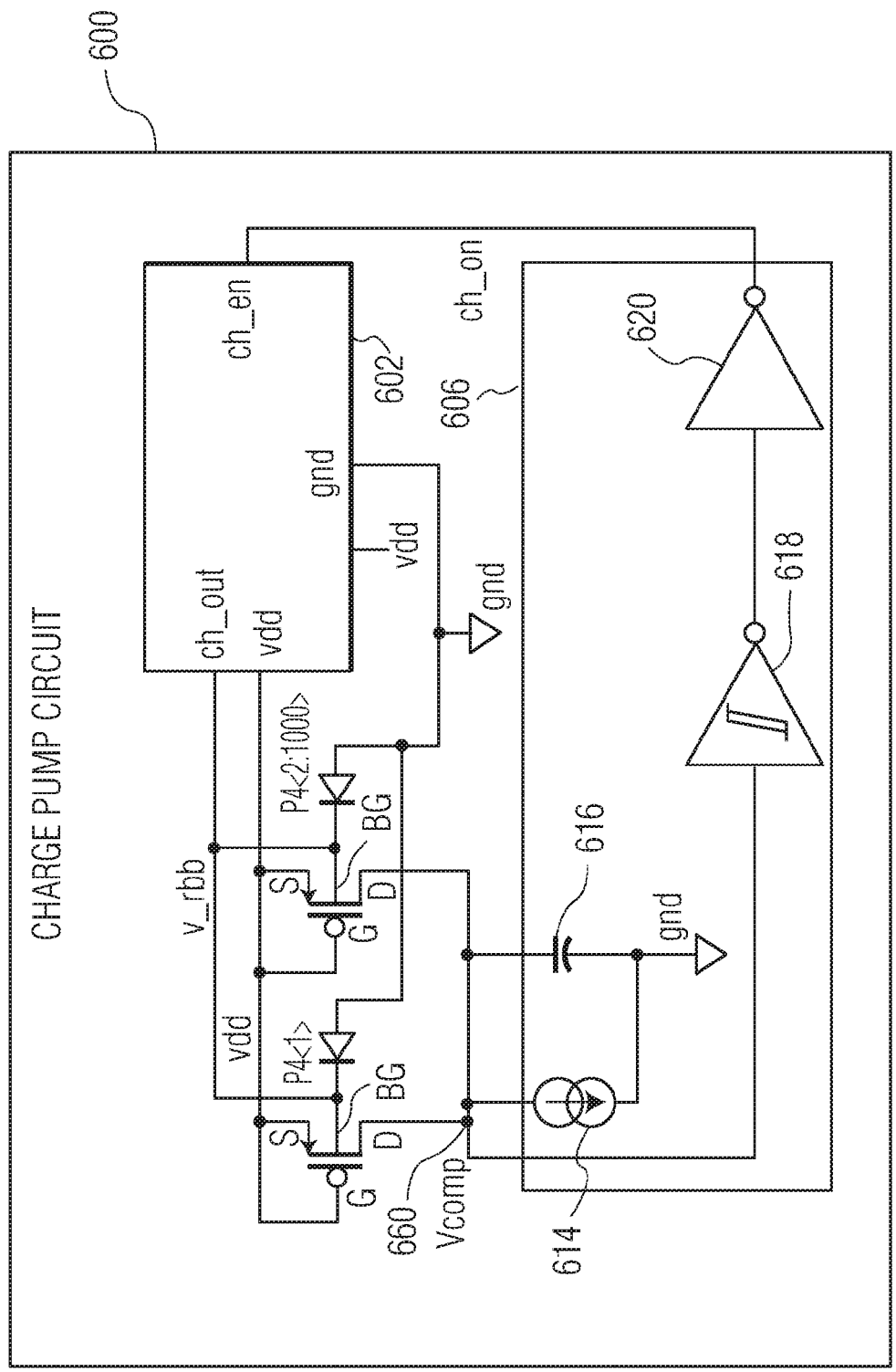
FIG. 6 depicts an embodiment of the charge pump circuit depicted in FIG. 1 that is configured to control leakage current within a transistor array.

FIG. 6 depicts an embodiment of the charge pump circuit 100 depicted in FIG. 1 that controls leakage current within a transistor array. In the embodiment depicted in FIG. 6, a charge pump circuit 600 includes a charge pump 602, a transistor array includes sea of gates/transistors, "P4<1:1000>," and a control circuit 606. Although the transistor array depicted in FIG. 6 includes 1,000 transistors, in other embodiments, the transistor array may include other suitable number of transistors, which may be fewer than 1,000 transistors or more than 1,000 transistors. The charge pump circuit 600 depicted in FIG. 6 is one possible embodiment of the charge pump circuit 100 depicted in FIG. 1. However, the charge pump circuit 100 depicted in FIG. 1 is not limited to the embodiment shown in FIG. 6.

In the charge pump circuit 600 depicted in FIG. 6, the source terminal S and the gate terminal G of the PMOS transistor P4<1> are connected to each other. In addition, the source terminal S and the gate terminal G of the PMOS transistor P4<1> are connected to each other. In addition, the source terminal and the gate terminal of the PMOS transistor P4<1> are connected to the supply voltage Vdd. The source terminal and the gate terminal of the PMOS transistors P4<2:1000> are connected to each other. In addition, the source terminal S and the gate terminal G of each of the PMOS transistors P4<2:1000> are connected to each other.

In addition, the source terminal S and the gate terminal G of the each of PMOS transistors P4<2:1000> are connected to the supply voltage Vdd. The back gate terminals BG of the PMOS transistors P4<1:1000> are connected to the charge pump voltage v_rbb that is generated by the charge pump.

In the charge pump circuit 600 depicted in FIG. 6, the control circuit 606 includes a current source 614, a capacitor 616, a Schmitt trigger 618 with an inverted output, and an inverter circuit 620. The current source 614 and the capacitor 616 are connected to the drain terminals D of the PMOS transistors, P4<1:1000> and the Schmitt trigger. The Schmitt trigger is connected to the inverter circuit, which is connected to an input terminal, "ch_en," of the charge pump 602. The Schmitt trigger is configured to generate a logic output signal in response to the input voltage. The inverter circuit is configured to invert the logic output signal from the Schmitt trigger into a logic signal, "ch_on," which is input into an enablement input terminal, "ch_en," of the charge pump.

In an example operation of the control circuit 606, a current comparison is performed at a node 660 that is connected to the drain terminals D of the PMOS transistors P4<1:1000>, to the current source 614, to the capacitor 616, and to the Schmitt trigger 618. Because the gate and source terminals of each of the PMOS transistors P4<1:1000>, are connected to each other, the drain current of a PMOS transistor is equal to the leakage current of the PMOS transistor. If the sum of the drain current of the PMOS transistors P4<1:1000> is higher than the current level of the current source 614, the voltage "vcomp" at the node 660 rises above a certain threshold and the output signal ch_on of the inverter circuit 620 changes to the logic high, which turns on the charge pump 602. After the charge pump is turned on, the charge pump output voltage r_rbb rises at a relatively slow pace. The leakage current of the PMOS transistors P4<1:1000> can be expressed as:

$$I_{Dleak} = \frac{W}{L} \cdot I_{SVTH} \cdot e^{\frac{V_{GS}-V_{THO}}{n \cdot Vt}} \cdot e^{\frac{V_{BK2VTH}(V_{BKB})}{n \cdot Vt}}, \quad (27)$$

where $I_{Dleak}$ represents the total leakage current of the PMOS transistors P4<1:1000>, W represents the gate length of a PMOS transistor P4, L represents the gate width of a PMOS transistor P4, Vgs represents the gate to source voltage of a PMOS transistor P4, Vt represents the thermal voltage of a PMOS transistor P4, $V_{THO}$ represents the zero bias MOS threshold voltage of a PMOS transistor P4, $V_{BKB}$ represents the back bias voltage of a PMOS transistor P4, and $V_{BK2VTH}$ represents the constant of the linear function of VT with respect to the back bias voltage. The gate width/length ratio of each PMOS transistor P4, the gate to source voltage $V_{GS}$ of a PMOS transistor P4, the threshold voltage $V_{THO}$ of a PMOS transistor P4, the threshold current $I_{SVTH}$, of a PMOS transistor P4, the thermal voltage Vt, and the voltage $V_{BK2VTH}$ can be approximated by constant values and the back bias voltage ($V_{BKB}$) of a PMOS transistor P4 is the difference between the charge pump output voltage v_rbb and the supply voltage vdd. Consequently, the leakage current of the PMOS transistors P4<1:1000> can be expressed as:

$$I_{Dleak} = I_{constant} \cdot e^{\frac{V_{BK2VTH} \cdot (V_{v\_rbb}-vdd)}{n \cdot Vt}}, \quad (28)$$

where $I_{constant}$ represents a constant current value and $V_{BK2VTH}$ can be approximated by a constant value. As evidenced by equation (28), the voltage v_rbb rises when the leakage current $I_{Dleak}$ of the PMOS transistors P4<1:1000> decreases. When the voltage v_rbb rises above a threshold voltage, the leakage current $I_{Dleak}$ of the PMOS transistors P4<1:1000> is reduced below the current level of the current source 614. Consequently, the voltage vcomp at the node 660 decreases, and, as a result, the logic signal ch_on changes to logic low, causing the charge pump to be turned off. The charge pump is turned off until its output voltage v_rbb falls below a certain voltage threshold, which causes the leakage current $I_{Dleak}$ of the PMOS transistors P4<1:1000> to rise above the current level of the current source 614 and the charge pump is turned on again. In the charge pump circuit 600 depicted in FIG. 6, the PMOS transistors P4<1:1000> can be selected or manufactured with specific configuration such that a specific gate width/length ratio of each PMOS transistor can be obtained. In addition, the current source 614 can be selected or manufactured with a specific current level. Consequently, the leakage current of the PMOS transistors P4<1:1000> can be reduced.

Figure 7:
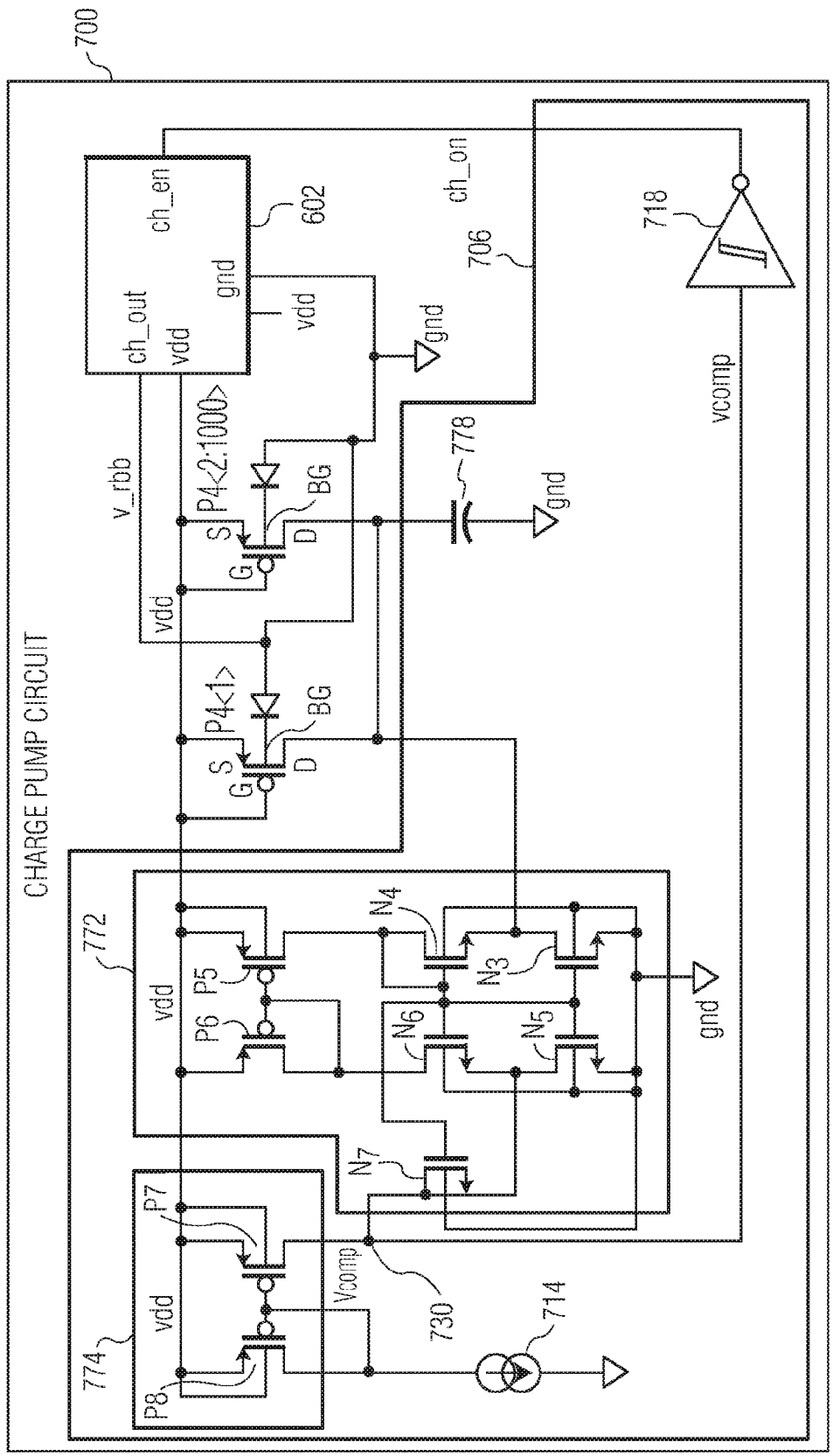
FIG. 7 depicts another embodiment of the charge pump circuit depicted in FIG. 1 that is configured to control leakage current within a transistor array.

FIG. 7 depicts another embodiment of the charge pump circuit 100 depicted in FIG. 1 that includes a control circuit 706 configured to control leakage current within a transistor array. In the embodiment depicted in FIG. 7, a charge pump circuit 700 includes the charge pump 602, a transistor array that includes a sea of gates/transistors, "P4<1:1000>," and a control circuit 706. The charge pump circuit 700 depicted in FIG. 7 is one possible embodiment of the charge pump circuit 100 depicted in FIG. 1. However, the charge pump circuit 100 depicted in FIG. 1 is not limited to the embodiment shown in FIG. 7.

A difference between the charge pump circuit 700 depicted in FIG. 7 and the charge pump circuit 600 depicted in FIG. 6 is that the control circuit 706 depicted in FIG. 7 includes a current source 714, a Schmitt trigger 718 with an inverted output, a first current mirror 772, a second current mirror 774, and a capacitor 778. The first current mirror includes PMOS transistors P5, P6 and NMOS transistors N3, N4, N5, N6, N7. The second current mirror includes PMOS transistors P7, P8. The capacitor is connected to the drain terminals D of the PMOS transistors P4<1:1000> and the first current mirror. The Schmitt trigger is connected to the first and second current mirrors and to an enablement terminal, "ch_en," of the charge pump 602. The Schmitt trigger is configured to generate a logic output signal "ch_on" in response to an input voltage. In the charge pump circuit 700 depicted in FIG. 7, the first current mirror works with low voltage drop and the second current mirror is a PMOS current mirror.

In an example operation of the control circuit 706, the total leakage current of the PMOS transistors P4<1:1000> and the reference current of the current source 714 are mirrored and a current comparison is performed at a node 730 that is connected to the first and second current mirrors and the Schmitt trigger 718. Because the gate and source terminals of each of the PMOS transistors P4<1:1000>, are connected to each other, the drain current of a PMOS transistor is equal to the leakage current of the PMOS transistor. If the sum of the drain current of the PMOS transistors P4<1:1000> is higher than the current level of the current source, the voltage vcomp at the node 730 falls below a certain threshold and the output signal ch_on of the Schmitt trigger changes to the logic high, which turns on the charge pump 602. After the charge pump is turned on, the charge pump output voltage r_rbb rises at a relatively slow pace. The leakage current of the PMOS transistors P4<1:1000> can be expressed as:

$$I_{Dleak} = \frac{W}{L} \cdot I_{SVTH} \cdot e^{\frac{V_{GS}-V_{THO}}{n \cdot Vt}} \cdot e^{\frac{V_{BK2VTH} \cdot (V_{BKB})}{n \cdot Vt}}, \quad (29)$$

where $I_{Dleak}$ represents the total leakage current of the PMOS transistors P4<1:1000>, W represents the gate length of a PMOS transistor P4, L represents the gate width of a PMOS transistor P4, Vgs represents the gate to source voltage of a PMOS transistor P4, Vt represents the thermal voltage of a PMOS transistor P4, $V_{THO}$ represents the zero bias MOS threshold voltage of a PMOS transistor P4, $V_{BKB}$ represents the back bias voltage of a PMOS transistor P4, and $V_{BK2VTH}$ represents the constant of the linear function of $V_{TH}$ with respect to the back bias voltage. The gate width/length ratio of each PMOS transistor P4, the gate to source voltage $V_{GS}$, the threshold voltage $V_{THO}$ of a PMOS transistor P4, the threshold current $I_{SVTH}$ of a PMOS transistor P4, the thermal voltage Vt, and the voltage $V_{BK2VTH}$ can be approximated by constant values and the back bias voltage ($V_{BKB}$) of a PMOS transistor P4 is the difference between the charge pump output voltage v_rbb and the supply voltage vdd. Consequently, the leakage current of the PMOS transistors P4<1:1000> can be expressed as:

$$I_{Dleak} = I_{constant} \cdot e^{\frac{-0.065 \cdot (V_{v\_rbb}-vdd)}{n \cdot Vt}}, \quad (30)$$

where $I_{constant}$ represents a constant current value. As evidenced by equation (30), the voltage v_rbb rises when the leakage current $I_{Dleak}$ of the PMOS transistors P4<1:1000> decreases. When the voltage v_rbb rises above a threshold voltage, the leakage current $I_{Dleak}$ of the PMOS transistors P4<1:1000> is reduced below the current level of the current source 714. Consequently, the voltage vcomp at the node 730 increases, and, as a result, the logic signal ch_on changes to logic low, causing the charge pump to be turned off. The charge pump is turned off until its output voltage v_rbb falls below a certain voltage threshold, which causes the leakage current $I_{Dleak}$ of the PMOS transistors P4<1:1000> to rise above the current level of the current source 714 and the charge pump is turned on again. In the charge pump circuit 700 depicted in FIG. 7, the PMOS transistors P4<1:1000> can be selected or manufactured with specific configuration such that a specific gate width/length ratio of each PMOS transistor can be obtained. In addition, the current source 714 can be selected or manufactured with a specific current level. Consequently, the leakage current of the PMOS transistors P4<1:1000> can be reduced.

Figure 8:
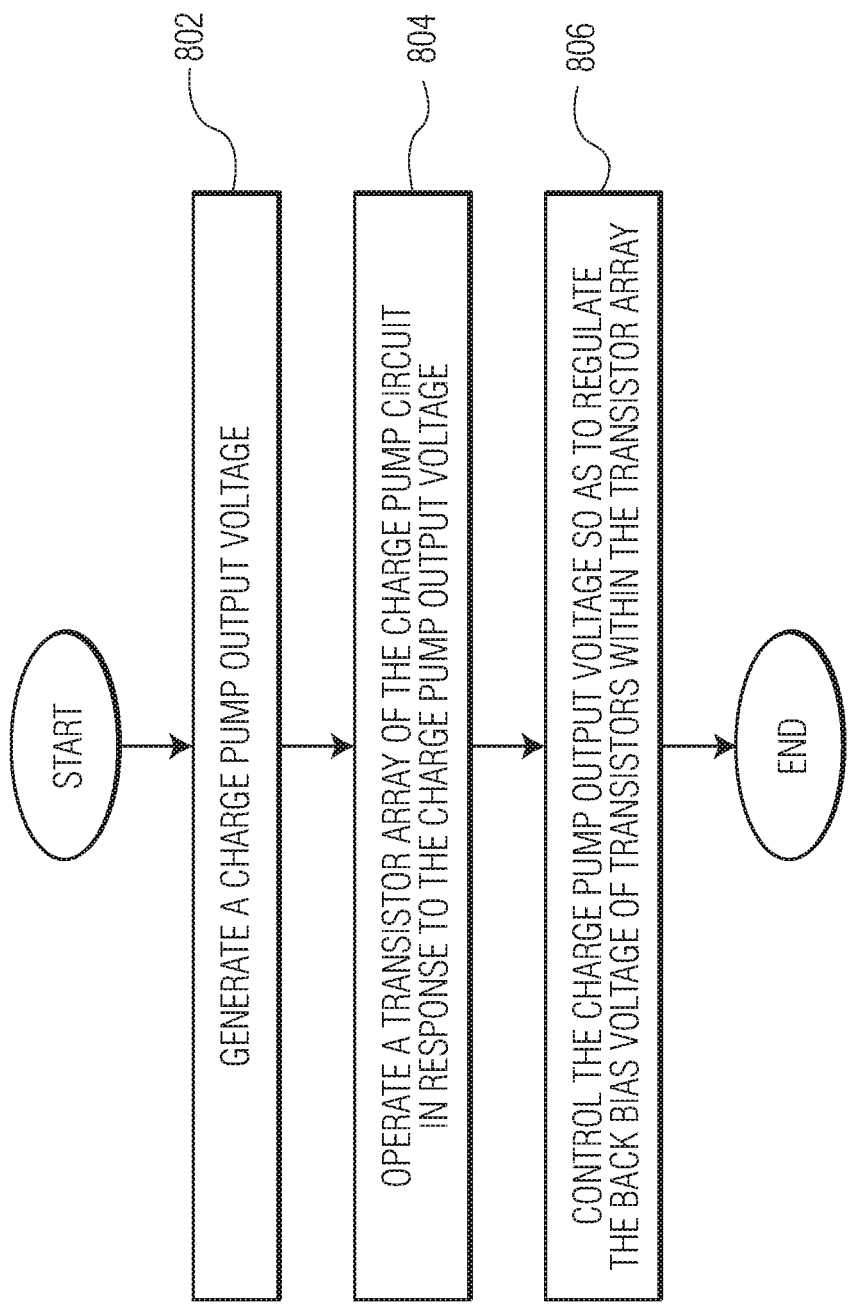
FIG. 8 is a process flow diagram of a method for operating a charge pump circuit in accordance with an embodiment of the invention.

FIG. 8 is a process flow diagram of a method for operating a charge pump circuit in accordance with an embodiment of the invention. At block 802, a charge pump output voltage is generated. At block 804, a transistor array of the charge pump circuit is operated in response to the charge pump output voltage. At block 806, the charge pump output voltage is controlled so as to regulate the back bias voltage of transistors within the transistor array. The charge pump circuit used to implement the method of FIG. 8 may be the same or similar to the charge pump circuit 100 depicted in FIG. 1, the charge pump circuit 200 depicted in FIG. 2, the charge pump circuit 300 depicted in FIG. 3, the charge pump circuit 400 depicted in FIG. 4, the charge pump circuit 500 depicted in FIG. 5, the charge pump circuit 600 depicted in FIG. 6, and/or the charge pump circuit 700 depicted in FIG. 7. The transistor array may be the same or similar to the transistor array 104 depicted in FIG. 1.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A charge pump circuit, the charge pump circuit comprising:
    a charge pump configured to generate a charge pump output voltage;
    a transistor array comprising a plurality of transistor devices, wherein the transistor devices includes at least one transistor device having a back gate terminal coupled to the charge pump output voltage, wherein the transistor array comprises:
        a first transistor device, wherein a gate terminal and a drain terminal of the first transistor device are connected to each other and to a first input terminal of the charge pump, and wherein a back gate terminal of the first transistor device is coupled to the charge pump output voltage; and
        a second transistor device, wherein a gate terminal and a drain terminal of the second transistor device are connected to each other and to a second input terminal of the charge pump, and wherein a back gate terminal and a source terminal of the second transistor device are coupled to a fixed voltage that is different from the charge pump output voltage; and a control circuit configured to control the charge pump output voltage so as to regulate the back bias voltage of the first transistor device within the transistor array.

2. The charge pump circuit of claim 1, wherein the control circuit comprises:
  a first current source connected to the gate terminal and the drain terminal of the first transistor device, to the first input terminal of the charge pump, and to a second fixed voltage; and
  a second current source connected to the gate terminal and the drain terminal of the second transistor device, to the second input terminal of the charge pump, and to the second fixed voltage.

3. The charge pump circuit of claim 2, wherein the first and second transistor devices are of the same type, and wherein a ratio between a gate width of the first transistor device and a gate length of the first transistor device is different from a ratio between a gate width of the second transistor device and a gate length of the second transistor device.

4. The charge pump circuit of claim 2, wherein the first and second transistor devices are of the same type, and wherein a current level of the first current source is different from a current level of the second current source.

5. The charge pump circuit of claim 2, wherein the fixed voltage is a positive fixed voltage, wherein the first and second transistor devices are PMOS transistors with source terminals connected to the positive fixed voltage, and wherein the first and second current sources are connected to ground.

6. The charge pump circuit of claim 2, wherein the first and second transistor devices are NMOS transistors with source terminals connected to ground, and wherein the first and second current sources are connected to a positive voltage.

7. The charge pump circuit of claim 1, wherein the control circuit comprises:
  a first current source connected to the gate terminal and the drain terminal of the first transistor device, to a first input terminal of the charge pump, and to a second fixed voltage;
  a resistor connected to the gate terminal and to the drain terminal of the second transistor device; and
  a second current source connected to the resistor, to a second input terminal of the charge pump, and to the second fixed voltage.

8. The charge pump circuit of claim 7, wherein the first and second transistor devices are of the same type, and wherein a ratio between a gate width of the first transistor device and a gate length of the first transistor device is equal to a ratio between a gate width of the second transistor device and a gate length of the second transistor device.

9. The charge pump circuit of claim 1, wherein a gate terminal and a source terminal of each of the transistor devices of the transistor array are connected to each other, and wherein a back gate terminal of each of the transistor devices is coupled to the charge pump output voltage.

10. The charge pump circuit of claim 9, wherein the gate terminal and the source terminal of each of the transistor devices are coupled to a fixed voltage.

11. The charge pump circuit of claim 10, wherein the control circuit comprises:
  a current source connected to the drain terminal of each of the transistor devices and to a second fixed voltage;
  a capacitor connected to the drain terminal of each of the transistor devices and to the second fixed voltage;
  a Schmitt trigger with an inverted output connected to the drain terminal of each of the transistor devices; and
  an inverter connected to an output terminal of the Schmitt trigger and to an input terminal of the charge pump.

12. The charge pump circuit of claim 10, wherein the control circuit comprises:
  a first current mirror connected to the gate terminal and to the source terminal of each of the transistor devices and to a second fixed voltage;
  a second current mirror connected to the gate terminal and to the source terminal of each of the transistor devices and to the first current mirror;
  a capacitor connected to the drain terminal of each of the transistor devices and to the second fixed voltage;
  a current source connected to the second current mirror and to the second fixed voltage; and
  a Schmitt trigger with an inverted output connected to the first and second current mirrors and to an input terminal of the charge pump.

13. The charge pump circuit of claim 10, wherein the transistor devices are of the same type, and wherein a ratio between a gate width of a first transistor device of the transistor devices and a gate length of the first transistor device is the same as a ratio between a gate width of a second transistor device of the transistor devices and a gate length of the second transistor device.

14. A method for operating a charge pump circuit, the method comprising:
  generating a charge pump output voltage;
  operating a transistor array of the charge pump circuit in response to the charge pump output voltage, wherein the transistor array comprises:
    a first transistor device, wherein a gate terminal and a drain terminal of the first transistor device are connected to each other and to a first input terminal of the charge pump, and wherein a back gate terminal of the first transistor device is coupled to the charge pump output voltage; and
    a second transistor device, wherein a gate terminal and a drain terminal of the second transistor device are connected to each other and to a second input terminal of the charge pump, and wherein a back gate terminal and a source terminal of the second transistor device are coupled to a fixed voltage that is different from the charge pump output voltage; and
  controlling the charge pump output voltage so as to regulate the back bias voltage of the first transistor device within the transistor array.

* * * * *